United States Patent
Adams et al.

(10) Patent No.: US 9,881,253 B2
(45) Date of Patent: Jan. 30, 2018

(54) SYNAPTIC NEURAL NETWORK CORE BASED SENSOR SYSTEM

(71) Applicant: INTERNATIONAL BUSINESS MACHINES CORPORATION, Armonk, NY (US)

(72) Inventors: Samuel S. Adams, Rutherfordton, NC (US); Wendy A. Belluomini, San Jose, CA (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 14/535,779

(22) Filed: Nov. 7, 2014

(65) Prior Publication Data

US 2016/0132766 A1    May 12, 2016

(51) Int. Cl.
*G06N 3/063* (2006.01)
*G06N 3/04* (2006.01)
*G06F 1/26* (2006.01)

(52) U.S. Cl.
CPC ............. *G06N 3/063* (2013.01); *G06N 3/049* (2013.01); *G06F 1/26* (2013.01)

(58) Field of Classification Search
None
See application file for complete search history.

(56) References Cited

U.S. PATENT DOCUMENTS 3,609,503 A * 9/1971 Burkett ................. H02J 7/0093
320/129

5,517,429 A    5/1996 Harrison
(Continued)

FOREIGN PATENT DOCUMENTS

CN    101420772 A    4/2009
CN    101839684 A    9/2010
(Continued)

OTHER PUBLICATIONS

Imam, Nabil, et al. "A digital neurosynaptic core using event-driven qdi circuits." Asynchronous Circuits and Systems (ASYNC), 2012 18th IEEE International Symposium on. IEEE, 2012.*
Arthur, John V., et al. "Building block of a programmable neuromorphic substrate: A digital neurosynaptic core." Neural Networks (IJCNN), The 2012 International Joint Conference on. IEEE, 2012.*
(Continued)

*Primary Examiner* — Kakali Chaki
*Assistant Examiner* — Eric Nilsson
(74) *Attorney, Agent, or Firm* — Law Office of Jim Boice (57) ABSTRACT

A sensor system comprises: an energy storage device; an intermittent energy release device electrically coupled to the energy storage device, wherein the intermittent energy release device causes the energy storage device to release stored energy intermittently; a sensor electrically coupled to the energy storage device; a register electrically coupled to the sensor, wherein the register stores readings from the sensor; a synaptic neural network core electrically coupled to the sensor, wherein the synaptic neural network core converts the readings from the sensor into a synthetic context-based object that is derived from the readings and a context object; a transponder electrically coupled to the synaptic neural network core; and a storage buffer within the transponder, wherein the storage buffer stores the synthetic context-based object for transmission by the transponder to a monitoring system.

20 Claims, 9 Drawing Sheets

(56) References Cited

U.S. PATENT DOCUMENTS

| | | | |
|---|---|---|---|
| 6,218,687 | B1 | 4/2001 | Ziegler |
| 6,889,165 | B2 | 5/2005 | Lind et al. |
| 7,436,789 | B2 | 10/2008 | Caliskan et al. |
| 8,036,847 | B2 | 10/2011 | Discenzo |
| 8,384,542 | B1 | 2/2013 | Merrill et al. |
| 8,615,374 | B1 | 12/2013 | Discenzo |
| 8,836,503 | B2 | 9/2014 | Gelvin et al. |
| 8,850,242 | B2 | 9/2014 | Jessup et al. |
| 2003/0005030 | A1 | 1/2003 | Sutton et al. |
| 2003/0081121 | A1* | 5/2003 | Kirmuss ............... B60R 11/02 348/143 |
| 2007/0297714 | A1 | 12/2007 | Dua et al. |
| 2012/0246499 | A1* | 9/2012 | Jessup ................ G06F 1/3203 713/320 |
| 2013/0030725 | A1 | 1/2013 | Friedlander et al. |

FOREIGN PATENT DOCUMENTS

| | | |
|---|---|---|
| CN | 101957600 A | 1/2011 |
| CN | 102255965 A | 11/2011 |

OTHER PUBLICATIONS

Dearborn, Scott. "Charging Li-ion batteries for maximum run times." Power Electronics Technology 31.4 (2005): 40-49.*

Raissii, F. "A brief analysis of the field effect diode and breakdown transistor."IEEE Transactions on Electron Devices 43.2 (1996): 362-365.*

B. Cook, et al. "Only skin deep: Inkjet-printed zero-power sensors for large-scale RFID-integrated smart skins." Microwave Magazine, IEEE 14.3 (2013): 103-114.

M. Nordman, "A task scheduler framework for self-powered wireless sensors." ISA transactions 42.4 (2003): 535-545.

J. Hsu, "How IBM Got Brainlike Efficiency From the TrueNorth Chip", IEEE, spectrum.ieee.org, Sep. 29, 2014, pp. 1-3.

P. Merolla et al., "A Digital Neurosynaptic Core Using Embedded Crossbar Memory with 45pJ per Spike in 45nm", IEEE, Custom Integrated Circuit Conference, Sep. 19, 2011, pp. 1-4.

International Application No. PCT/IB2015/057666—International Search Report and Written Opinion dated Jan. 8, 2016.

* cited by examiner

| TABLE | EXCITATORY | INHIBITORY |
|---|---|---|
| ACCELEROMETER | POSITIVE | NEGATIVE |
| LIGHT SENSOR | LIGHT | DARK |
| SOUND SENSOR | POSITIVE | NEGATIVE |
| VIBRATION SENSOR | POSITIVE | NEGATIVE |
| MOISTURE SENSOR | WET | DRY |

SYNAPTIC NEURAL NETWORK CORE BASED SENSOR SYSTEM

BACKGROUND

The present disclosure relates to the field of electronic devices, and specifically to electronic devices used to sense physical conditions. Still more particularly, the present disclosure relates to incorporating a synaptic neural network into a sensor system.

Sensors detect a wide variety of physical conditions, such as heat, pressure, acceleration, etc. Readings from such sensors are then used to establish detailed descriptions of environments.

SUMMARY

In an embodiment of the present invention, a sensor system comprises: an energy storage device; an intermittent energy release device electrically coupled to the energy storage device, wherein the intermittent energy release device causes the energy storage device to release stored energy intermittently; a sensor electrically coupled to the energy storage device; a register electrically coupled to the sensor, wherein the register stores readings from the sensor; a synaptic neural network core electrically coupled to the sensor, wherein the synaptic neural network core converts the readings from the sensor into a synthetic context-based object that is derived from the readings and a context object; a transponder electrically coupled to the synaptic neural network core; and a storage buffer within the transponder, wherein the storage buffer stores the synthetic context-based object for transmission by the transponder to a monitoring system.

In an embodiment of the present invention, a method of optimizing sensor operations comprises: storing electrical energy on an energy storage device; intermittently releasing stored electrical energy from the energy storage device to a sensor, wherein intermittently released stored electrical energy from the energy storage device activates one or more sensing units in the sensor; capturing sensor readings by the one or more sensing units in the sensor; transmitting the readings to a register for storage; loading the readings from the register onto a synaptic neural network core; converting, by the synaptic neural network core, the readings into a synthetic event identifier, wherein the synthetic event identifier is generated from the readings and a context object; loading the synthetic event identifier onto a register on a transponder device; and transmitting the synthetic event identifier from the transponder device to a monitoring system.

In an embodiment of the present invention, a sensor system comprises: an energy storage device; an intermittent energy release device electrically coupled to the energy storage device, wherein the intermittent energy release device causes the energy storage device to release stored energy intermittently; a synaptic neural network core electrically coupled to the intermittent energy release device, wherein the synaptic neural network core converts the readings from a sensor into a synthetic context-based object that is derived from the readings and a context object; a transponder electrically coupled to the synaptic neural network core; and a storage buffer within the transponder, wherein the storage buffer stores the synthetic context-based object for transmission by the transponder to a monitoring system.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
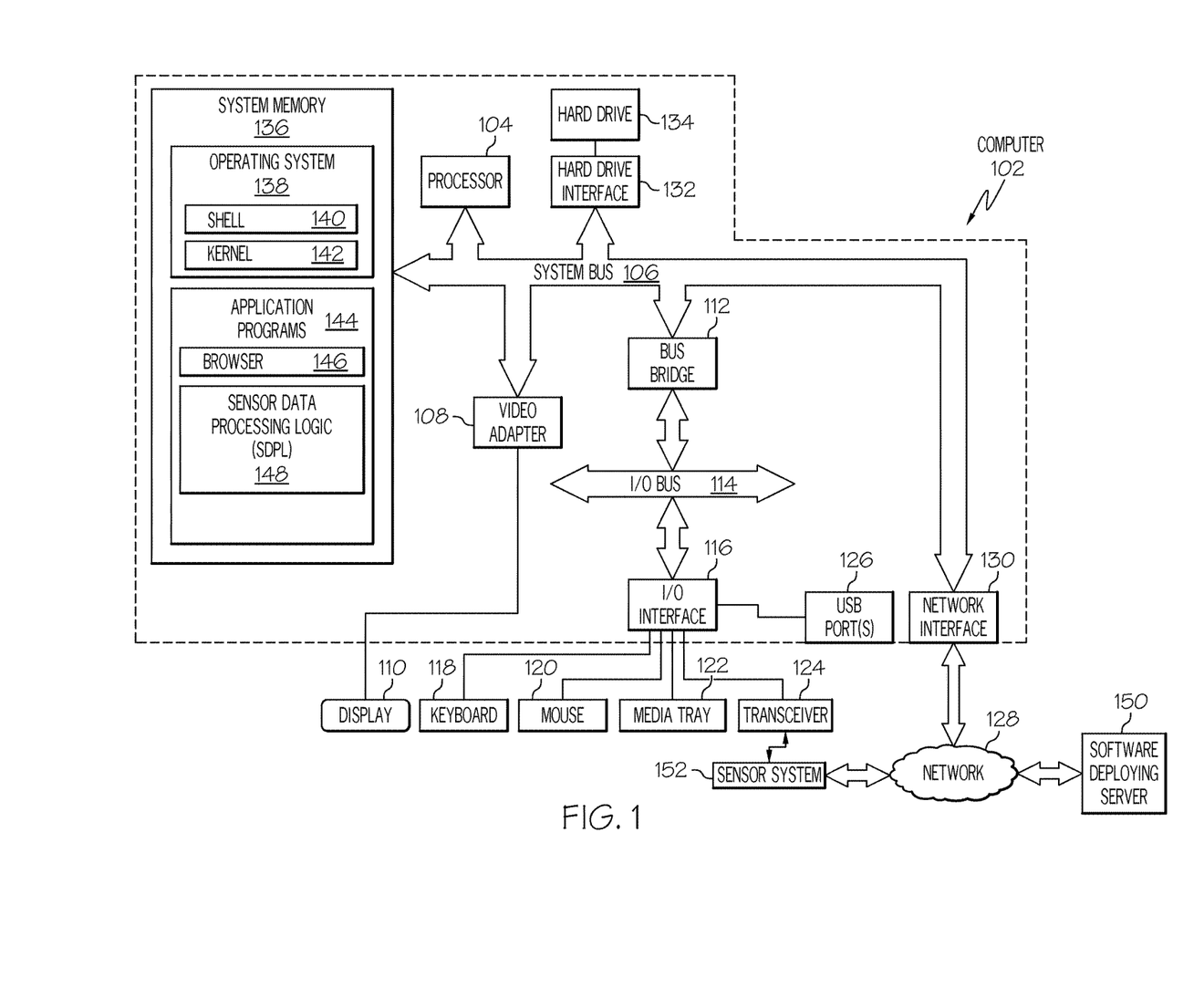
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or monitoring system 202 depicted in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Sensor Data Processing Logic (SDPL) 148. SDPL 148 includes code for implementing the processes described below, including those described in FIGS. 2-8. In one embodiment, computer 102 is able to download SDPL 148 from software deploying server 150, including in an on-demand basis, wherein the code in SDPL 148 is not downloaded until needed for execution. Note further that, in one embodiment of the present invention, software deploying server 150 performs all of the functions associated with the present invention (including execution of SDPL 148), thus freeing computer 102 from having to use its own internal computing resources to execute SDPL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
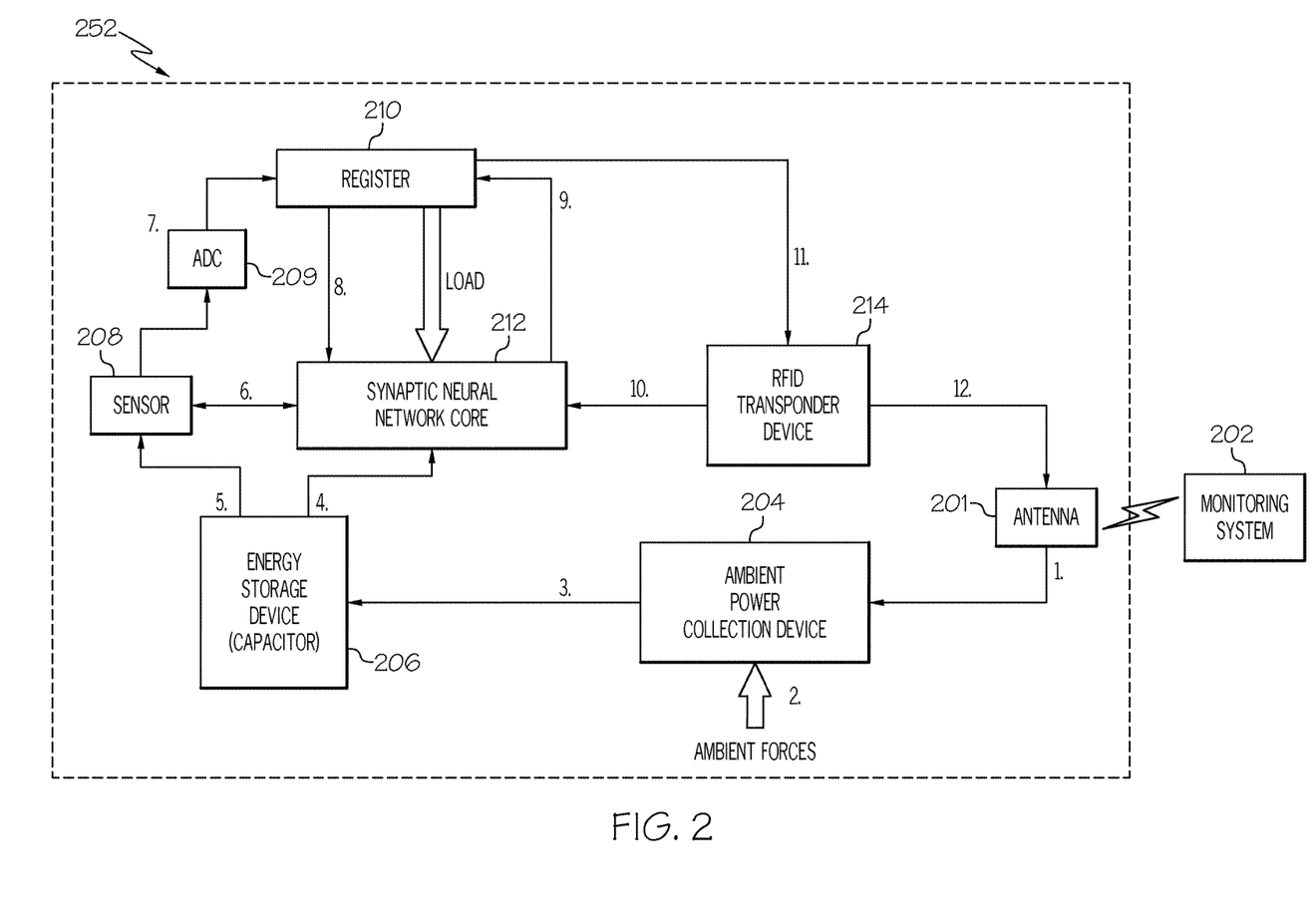
FIG. 2 illustrates an exemplary architecture for a sensor system in accordance with one or more embodiments of the present disclosure.

With reference now to FIG. 2, an exemplary architecture for a sensor system 252 (analogous to sensor system 152 in FIG. 1) and use thereof is presented in accordance with one or more embodiments of the present disclosure. As described herein, in an exemplary embodiment of the present invention, there are no processors within the sensor system 252. Thus, speed is higher while power demand is lower as compared to sensor systems in the prior art that utilize processors to manage sensor data. Any processor usage is thus confined to a monitoring system 202 (analogous to computer 102 in FIG. 1), which monitors the operations of and/or receives readings from the sensor system 252. Components of sensor system 252 are described in conjunction with exemplary operations performed by sensor system 252, as depicted by steps 1-12.

At step 1, an antenna 201 receives signals and ambient energy from monitoring system 202. Exemplary signals include, but are not limited to, interrogation signals, activation signals, etc., while ambient energy is energy (e.g., radio frequency (RF) energy) that is transmitted to the antenna 201 from the monitoring system 202.

For example, assume that monitoring system 202 sends an RF signal to antenna 201, requesting an update of sensor data captured by sensor 208. This RF signal achieves two results. First, the RF signal itself is energy, and thus can be converted into electricity by ambient power collection device 204, thereby powering the sensor system 252 and/or specific components therein. Second, the RF signal may contain rudimentary instructions that are interpretable by a synaptic neural network core (SNNC) 212, causing certain operations (e.g., activating sensor 208, sending sensor readings from sensor 208 to a register 210, converting these readings into a synthetic event identifier, etc., as described herein).

At step 2, other ambient forces are converted into electrical power by ambient power collection device (APCD) 204. Such ambient forces may be mechanical, chemical, electrical, pressure based, photo based, sound based, thermoelectric, etc.

For example, a mechanical force processed by APCD 204 may be physical acceleration of the sensor system 252, which occurs when acceleration movement is imposed on the sensor system 252 by wind, water, and other natural forces, or by movement of a user/system to which the sensor system 252 is attached. Movement of the sensor system 252 and the APCD 204 forces a physical device (e.g., an accelerometer, or any other movable/deflectable item) within the APCD 204 to convert the physical motion of the acceleration into electrical energy. Exemplary devices used to convert physical motion into electrical energy include, but are not limited to, piezoelectric generators, piezoelectric nanogenerators, viroelectric systems that utilize piezoelectric properties of biological material to create electricity as the biological material (e.g., bacteria) is moved/deformed, semiconductor piezoelectric devices, etc.

Converting chemical energy into electrical energy may be achieved by the use of solid oxide fuel cells (SOFCs) that convert ambient oxygen into oxygen ions in order to create an electron flow, a micro-fuel cell that generates electricity by oxidizing fuel, etc. In one embodiment, the fuel is stored within the APCD 204. In a preferred embodiment, however, the fuel is extracted from ambient air.

Converting one form of electrical energy, such as an RF signal, into usable DC current, may be accomplished through the use of a rectenna (i.e., a "rectifying antenna" that uses diodes and/or transistors to convert high frequency RF signals into DC voltage), a voltage multiplier circuit, Schottky diodes, magnetic resonant near field coupling, etc. The source of the (non-DC) electrical energy may be from an RF signal from the monitoring system 202, or it may be from ambient electrical conditions, such as an electromagnetic field generated by a nearby power line.

Converting pressure into electricity may be achieved through the use of piezoelectric crystals that convert pressure changes into electricity. The source of the pressure change may be atmospheric changes (e.g., changes to atmospheric pressure that occur with weather fronts, etc.), oceanic changes (e.g., changes in pressure as the sensor system 252 goes deeper underwater), etc. Converting sound pressure into electricity also uses such pressure-sensitive devices.

Converting light into electricity (photo based electrical generation) may be achieved through the use of photovoltaic cells. The source of the light is ambient light, either natural (sunlight, moonlight, starlight) or artificial (e.g., light bulbs)

Converting heat into electricity (thermoelectric) uses thermocouples, thermistors, a Peltier cooler, etc., which use heat to cause movement of junctions between two types of materials, thus generating electricity. Sources of the heat include ambient conditions, such as heat generated by the sun, heat generated by nearby machinery/engines, etc.

In one or more embodiments of the present invention, generation of electricity by the APCD 204 also acts as a trigger/enablement of the sensor 208 and/or SNNC 212. For example, assume that the APCD 204 converts vibrations into electricity. Assume further that the APCD 204 is mounted on a bridge. If there is no traffic on the bridge, then there is no vibration of the APCD 204, and thus there is no electricity being generated. However, if light traffic is on the bridge, then a light amount of electricity will be generated, thus causing a few of the motion detectors in the sensor 208 to turn on. Similarly, if there is heavy traffic on the bridge, then a larger amount of electricity will be generated, thus causing more of the motion detectors in the sensor 208 to turn on.

Assume further for illustrative purposes that sensor system 252 is used to monitor a bridge for security purposes, and that sensor system 252 detects vibration of the bridge. If only light traffic (e.g., a few cars) is crossing the bridge, then the APCD 204 only generates enough power from its motion-to-electricity converter to power up a few of the vibration detectors in the sensor 208. These few readings may not initiate activities within the SNNC 212 and/or a radio frequency identification (RFID) transponder device 214 to report the readings. However, if there is heavy traffic (e.g., large trucks that pose a threat to whatever the bridge is protecting access to), then the APCD 204 generates more electricity, causing 1) more motion detectors within sensor to be activated, and/or 2) SNNC 212 to initiate additional activities such as generating an alert, and/or 3) enabling the RFID transponder device 214 to issue the alert/warning. Thus, the APCD 204 allows the sensor system 252 to be "quiet" until some condition exists (e.g., large trucks moving across the bridge), and thus is imperceptible to counter-activities during periods in which the event is not occurring.

Continuing with FIG. 2, in step 3 the captured energy is stored in an energy storage device 206. As described below, in a preferred embodiment energy storage device 206 is capacitor-based, using a capacitor with high capacitance and low internal resistance. This allows the capacitor to quickly charge (from the APCD 204) and easily discharge (to the sensor 208 and/or SNNC 212). However, as discussed below, in one embodiment an external high-ohm resistor is between the energy storage device 206 and the sensor 208 and/or SNNC 212, thus allowing power to flow to the sensor 208 and/or SNNC 212 over a longer period of time.

In step 4 in FIG. 2, the SNNC 212 is powered up from energy from the energy storage device 206. Powering up the SNNC 212 has several potential effects. First, the SNNC 212 may load any sensor data that has been previously stored in the register 210, which stores readings taken by sensor 208. Second, the SNNC 212 may direct the sensor 208 to start taking new sensor readings. Third, the SNNC 212 may direct the RFID transponder device 214 to transmit readings from the register 210, and/or data derived therefrom (e.g., a synthetic event descriptor—described below) to the monitoring system 202.

In step 5 in FIG. 2, the sensor 208 is powered up. In step 6, the SNNC 212 instructs the sensor 208 to take new readings. This series of steps assumes that the SNNC 212 is directing the operation of the sensor 208. However, as described in an embodiment below, operation of sensor 208 may be initiated directly by sensor 208.

Continuing with the embodiment in which SNNC 212 is controlling sensor 208, in step 7 readings from sensor 208 are sent to register 210. As indicated by analog-to-digital converter (ADC) 209, in one embodiment the readings taken by sensor 208 are initially analog (e.g., generating voltage levels that correspond to intensity of the movement, light, sound, etc. captured by the sensor 208). Register 210, which may be a first-in first-out (FIFO) buffer, a circular buffer, any type of non-volatile memory, etc., is able to store only digital (binary) information, thus requiring the use of ADC 209. In a preferred embodiment, the (digitized) readings from sensor 208 are in bits, not bytes. That is, only small quantities of information (e.g., 6-10 bits) are transmitted in register 210, thus preserving bandwidth and reducing power consumption.

In step 8 in FIG. 2, contents of register 210 are loaded into the SNNC 212, where it is converted into a desired form for storage in register 210 (step 9). That is, register 210 may have two different buffers: one for sensor data from sensor 208, and one for processed data from SNNC 212. Alternatively, processed data from SNNC 212 may overwrite the sensor data from sensor 208, thus further reducing the size of register 210.

As discussed below, the processed data from SNNC 212 may include the actual data received from sensor 208. However, in a preferred embodiment, the processed data from SNNC 212 is a smaller packet than the actual data from sensor 208, such as a synthetic event identifier (discussed below), thus reducing the bandwidth requirement for transmitting information from the sensor system 252 to the monitoring system 202.

In step 10, the RFID transponder device 214 requests the data (raw or processed) from the SNNC 212, assuming that the SNNC 212 does not push (or has not pushed) such data to the RFID transponder device 214.

In step 11, the RFID transponder device 214 reads data (raw or processed) from the register 210, and appends that data to RFID identification numbers for the RFID transponder device 214.

In step 12, the RFID transponder device 214 sends the data (raw or processed) to the antenna 201, which transmits the data (raw or processed) to the monitoring system 202.

Figure 3:
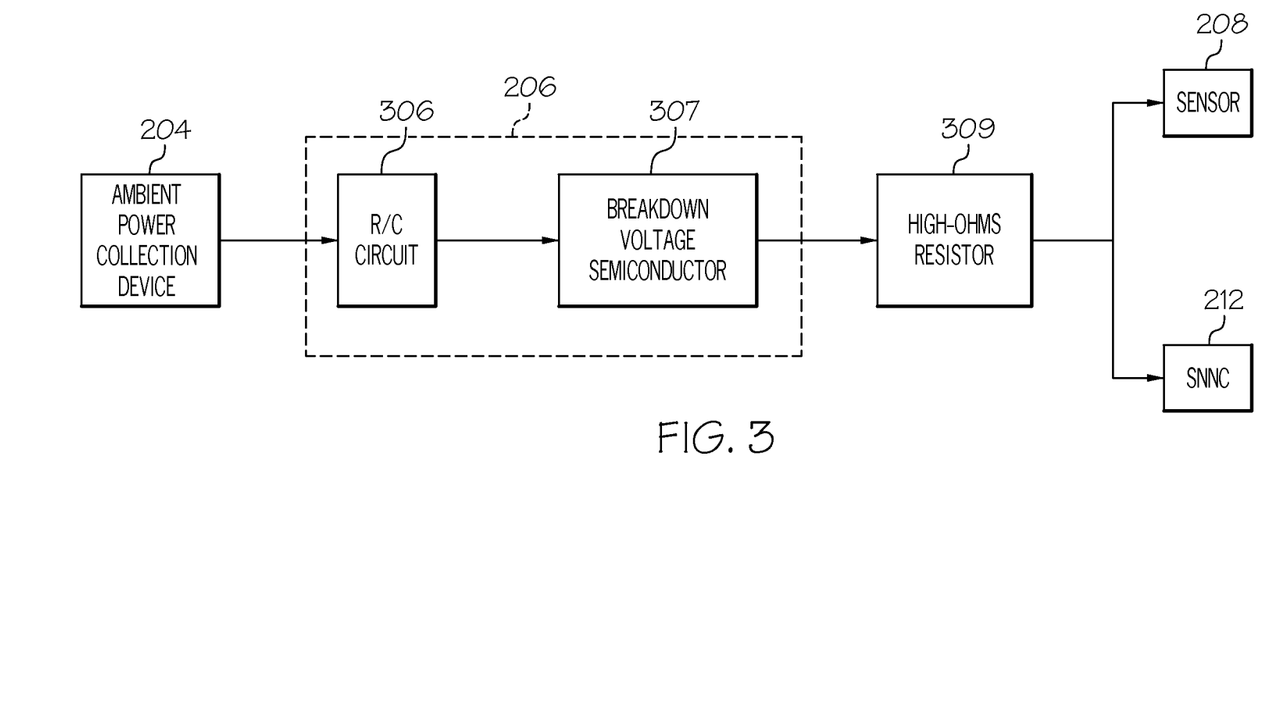
FIG. 3 depicts additional detail of the sensor system illustrated in FIG. 2.
Figure 4:
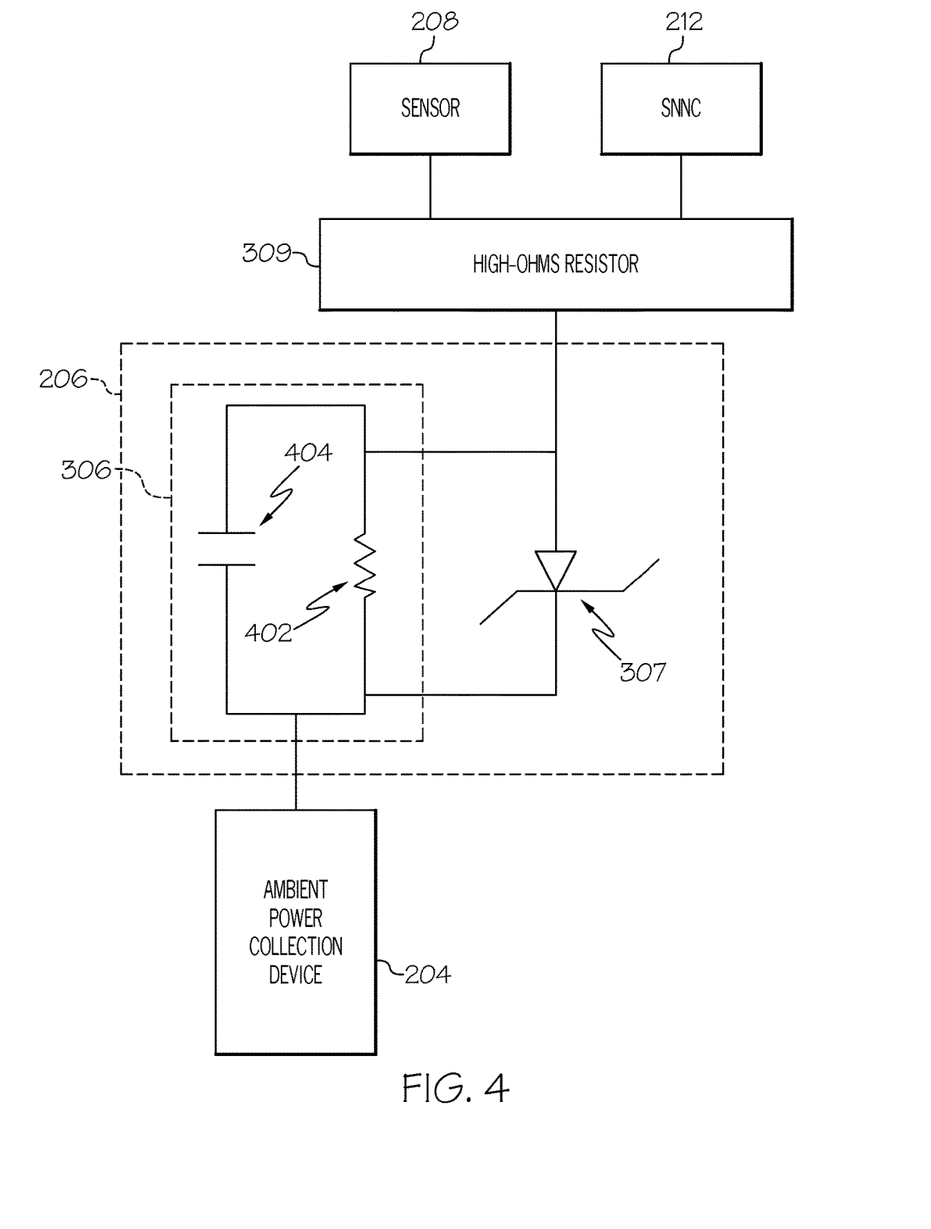
FIG. 4 illustrates additional circuitry detail of one or more components depicted in FIG. 3.

With reference to FIG. 3 and FIG. 4, additional detail of the sensor system 252 and/or components therein as illustrated in FIG. 2 is presented. FIG. 3 depicts the ambient power collection device 204, the energy storage device 206, the sensor 208, and the SNNC 212 shown in FIG. 2. However, FIG. 3 also presents additional detail of the energy storage device 206, as well as a high-ohms resistor 309.

As described herein, the energy storage device 206 includes a resistor/capacitor (R/C) circuit 306. As shown in FIG. 4, this includes a high capacitance capacitor 404 (e.g., more than 10 microfarads) and a low resistance resistor 402 (e.g., selected for its ability to allow a predefined amperage to pass through the resistor 402). Thus, when power is received from the ambient power collection device 204, the electrons accumulate on the lower plate of the capacitor 404, and then bleed through the resistor 402 to the high-ohms resistor 309.

Alternatively, a breakdown voltage semiconductor, which may be a breakdown transistor or a breakdown diode, such as the depicted Zener diode 307, controls the flow of electrons to the high-ohms resistor 309. For example, assume that resistor 402 is relatively high, such that it provides a significant blockage of amperage flow from the energy storage device 206, including that stored on capacitor 404. However, charging the capacitor 404 results in a voltage gradient, which is detected by the Zener diode 307. When this voltage reaches a predefined high level, then the Zener diode 307 breaks down, allowing current to freely flow from the ambient power collection device 204 and/or the capacitor 404 to the high-ohms resistor 309. When the voltage reaches a predefined low level (due to the release of the electrons from one of the plates on the capacitor 404 through the Zener diode 307), then the Zener diode 307 again closes, thus producing amperage spikes as the Zener diode 307 opens and closes. These amperage spikes cause sensor 208 and/or SNNC 212 and/or other components within sensor system 252 to turn on and off.

The high-ohms resistor 309 is selected based on how long the sensor 208 and/or SNNC 212 should be powered. That is, by using a high-ohms resistor 309 that allows only a trickle of amperage (but still enough to power the sensor 208 and/or SNNC 212), then the sensor 208 and/or SNNC 212 are able to operate for an extended period of time. However, by using a high-ohms resistor 309 that allows a larger flow of amperage, then the sensor 208 and/or SNNC 212 are able to operate for shorter, punctuated periods of time.

Figure 5:
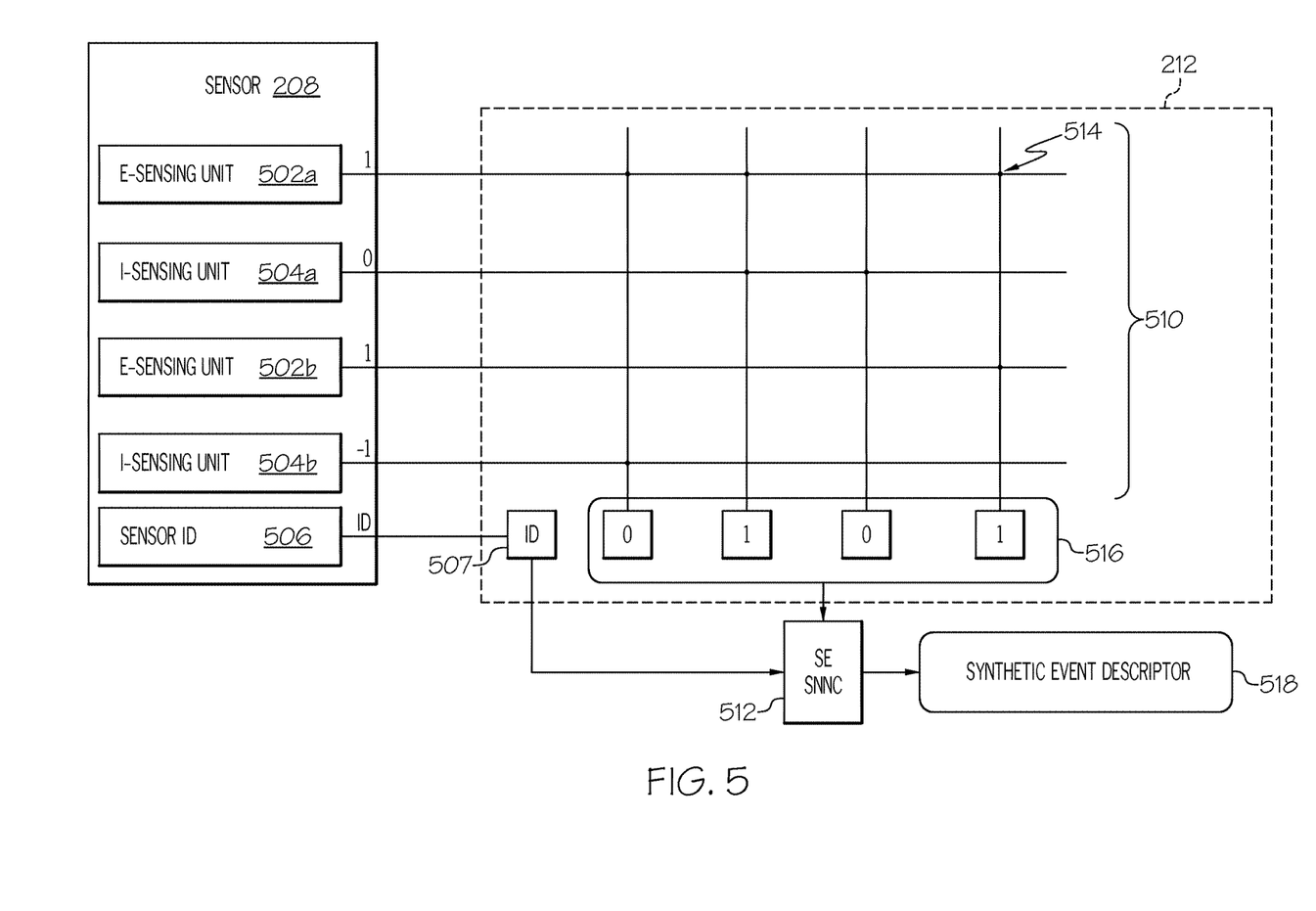
FIG. 5 depicts exemplary detail of a sensor and synaptic neural network core.

FIG. 5 depicts exemplary operational details of SNNC 212. As depicted in FIG. 5, SNNC 212 does not use any processors. Rather, SNNC 212 is a non-complex circuit that uses synaptic connections between electronic neurons to provide requisite logic for the system. In one embodiment of the present invention, the synaptic connections are transistors that are controlled by the strength of a signal on the electronic neuron. For example, assume that the sensor 208 has generated a signal indicating a strong vibration level. This strong vibration level may be converted into a certain voltage (e.g., between 4.0 and 5.0 $V_{DC}$). This voltage level (between 4.0 and 5.0 $V_{DC}$) will be enough to turn on the transistor that makes up the synaptic connection, thus connecting two electronic neurons as depicted in FIG. 5. However, if the sensor 208 only detected light vibration, then a lower voltage signal (e.g., between 1.0 and 2.0 $V_{DC}$) would be generated. This lower voltage would not be enough to turn on the transistor that is the synaptic connection, thus preventing the two electronic neurons from coupling.

As indicated above, in one embodiment, SNNC 212 controls the operations of sensor 208, register 210, and/or RFID transponder device 214. In order to illustrate the operation of SNNC 212, however, assume that sensor 208 interacts directly with SNNC 212 (without use of register 210 shown in FIG. 2 and without being controlled by SNNC 212). It is understood, however, that the operational features described herein for sensor 208 and/or SNNC 212 are applicable to any usage, including those in which SNNC 212 controls the operations of sensor 208.

Figure 6:
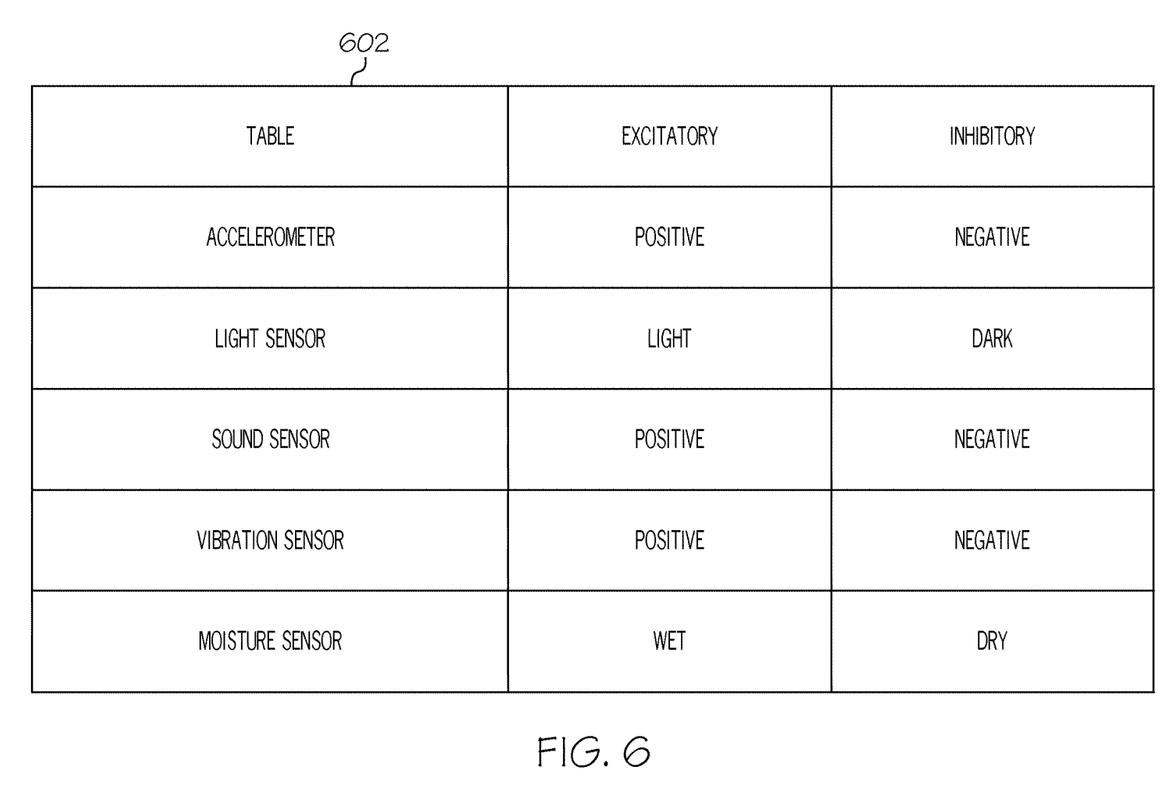
FIG. 6 is a table of exemplary features recorded by excitatory and inhibitory detectors in a sensor described in FIG. 5.

As shown in FIG. 5, assume that sensor 208 includes multiple sensing units. In an embodiment of the present invention, these sensing units include both excitatory sensing units (E-sensing units 502a-502b) as well as inhibitory sensing units (I-sensing units 504a-504b). As shown in FIG. 6, these different types of sensing units are triggered (and thus produce sensor reading outputs) by opposing events, as indicated in table 602. For example, sensing units may be designed to detect acceleration movement. Thus, an E-sensing unit 502a may be designed to detect acceleration in one direction ("positive" acceleration) while I-sensing unit 504a may detect acceleration in the opposite direction ("negative" acceleration, or "deceleration").

Similarly, when configured as a light sensor, E-sensing unit 502b may be configured to detect light, while I-sensing unit 504b may be configured to trigger an output if light levels striking I-sensing unit 504b drop below a certain level ("dark"). This affords the sensor 208 with the ability to detect sharp light edges.

Similarly, when configured as a sound sensor, E-sensing unit 502a may be configured to detect positive sound pressure, while I-sensing unit 504a may be configured to trigger an output in response to detecting negative pressure from the sound wave. This affords the sensor 208 with the ability to produce a more detailed representation of the entire sound/pressure spectrum (positive pressure and negative pressure) of the sound wave.

Similarly, when configured as a vibration sensor, E-sensing unit 502a may be configured to detect positive vibration pressure (i.e., "push"), while I-sensing unit 504a may be configured to trigger an output if negative vibration pressure (i.e., "pull") is detected. This affords the sensor 208 with the ability to produce a more detailed description of the entire spectrum (positive pressure and negative pressure) of a physical vibration.

Similarly, when configured as a moisture sensor, E-sensing unit 502a may be configured to detect dampness, while I-sensing unit 504a may be configured to detect dryness. This affords the sensor 208 with the ability to produce a more broad-spectrum description of how "wet" ambient conditions are.

As shown in FIG. 5, outputs from the E-sensing units 502a-502b and I-sensing units 504a-504b are transmitted via an array of electronic neurons 510 within the SNNC 212. The horizontal neurons 510 are selectively coupled to the vertical neurons 510 via electrical synapses, depicted as solid circles such as that for synapse 514. As shown, outputs from the E-sensing units 502a-502b (which, for example, may be either 1 or 0) can be offset by outputs from the I-sensing units 504a-504b (whose outputs may be either 0 or −1).

For example, assume that E-sensing unit 502a is outputting a "1", I-sensing unit 504a is outputting a "0", E-sensing unit 502b is outputting a "1", and I-sensing unit 504b is outputting a "−1", as shown in FIG. 5. The synaptic connectors between the neurons 510 results in the depicted values "0101" being stored in an SNNC buffer 516. The values from the SNNC buffer 516 are then sent, along with the identifier (ID) value from ID latch/buffer 507 (using data from sensor ID latch/buffer 506 that identify the sensor 208 and/or the sensor type that describes sensor 208), to a synthetic event (SE) SNNC 512.

SE SNNC 512 utilizes similar architecture as that shown for SNNC 212. That is, there are no processors, but rather specialized circuitry that responds to a few bits of data (e.g., 5 in the example shown in FIG. 5) to generate a synthetic event descriptor 518. As shown in the example in FIG. 5, the value held in ID latch/buffer 507 is "1". Thus, "10101" ("1" from the ID latch/buffer 507 and "0101" from the SNNC buffer 516) is sent to neurons in SE SNNC 512, which are synapse-coupled in a manner described for SNNC 212 in FIG. 5. The output of SE SNNC 512 is a synthetic event descriptor 518.

The synthetic event descriptor 518 may merely be the value stored in ID latch/buffer 507 appended to the values stored in the SNNC buffer 516. In this embodiment, the value stored in ID latch/buffer 507 is a context object, and the values stored in SNNC buffer 516 create a non-contextual data object. In an embodiment of the present invention, the context object provides context, and thus meaning, to non-contextual data. For example, non-contextual data "0101" is meaningless until associated with coded context data (e.g., "1" indicating that the non-contextual data came from a vibration sensor). Thus, together these values create a synthetic context-based object, such that the "1" from the ID latch/buffer 507 provides the context for the non-contextual data "0101" from the SNNC buffer 516.

Figure 7:
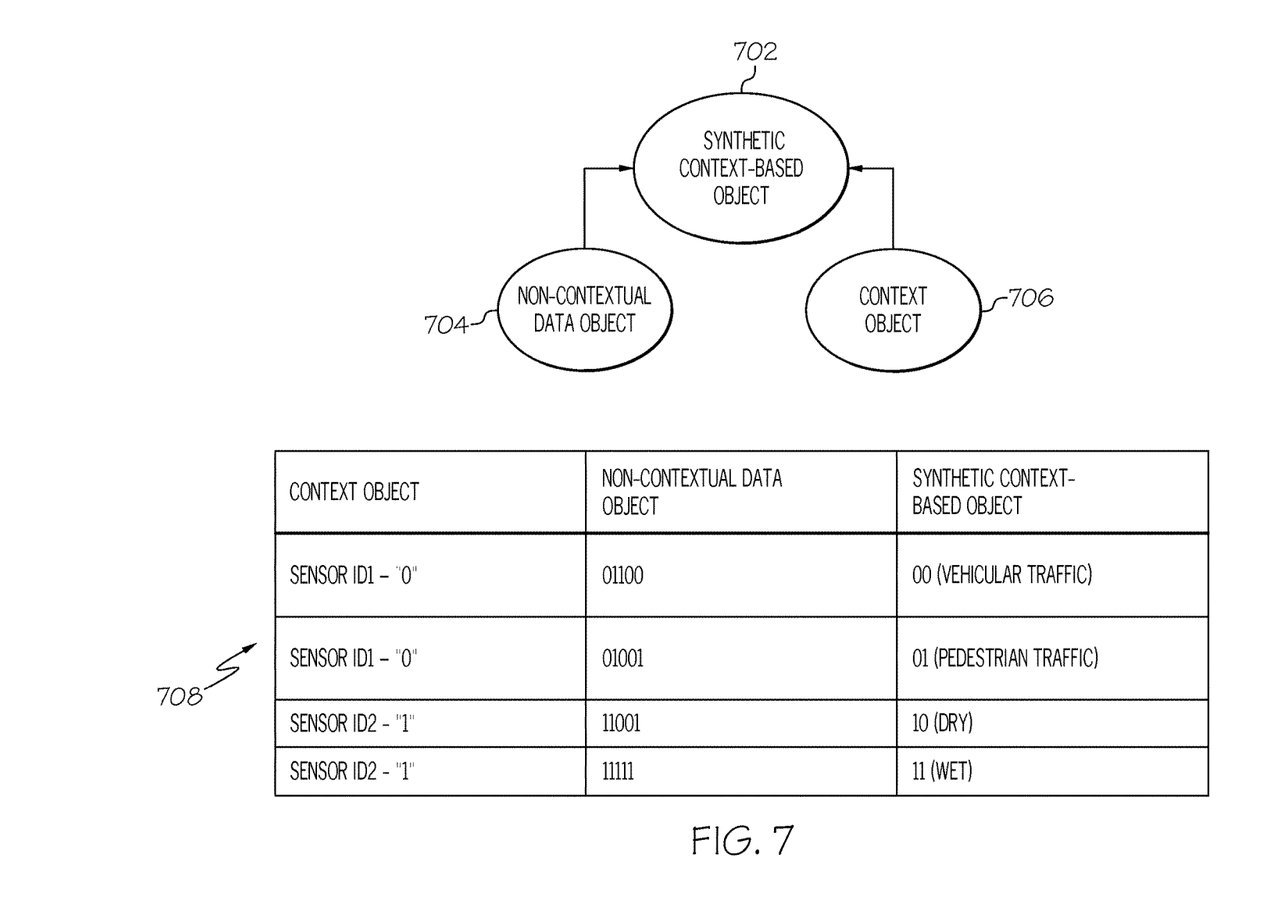
FIG. 7 illustrates an exemplary synthetic context-based object.

With reference now to FIG. 7, additional details of an exemplary synthetic context-based object 702 is presented. A non-contextual data object 704 is a data object that is meaningless, since it has no context. Thus, in the example from FIG. 5, "0101" from the SNNC 516 is meaningless, since there is no context for the values "0101". However, when associated with a context object 706 (e.g., the value from the ID latch/buffer 507), then a synthetic context-based object 702 can be created. That is, the value from ID latch/buffer 507 describes the sensor type (e.g., accelerometer, light sensor, sound sensor, chemical sensor, etc.) that describes sensor 208. With this information, the values "0101" become meaningful as describing acceleration levels, light levels, etc.

Returning to FIG. 7, assume for exemplary purposes that the non-contextual data object 704 includes five bits. Assume further that a value of "0" from ID latch/buffer 507 provides contextual information indicating that the sensor is a vibration sensor. Similarly, assume that a value of "1" from ID latch/buffer 507 provides contextual information indicating that the sensor is a moisture detector. In one embodiment, the synthetic context-based object 702 is merely a concatenation of the context object 706 (e.g., "0" for the vibration sensor ID) and the non-contextual data object 704 (e.g., "01100" for sensor readings describing vehicular traffic on a bridge). However, in a preferred embodiment, the synthetic context-based object 702 is reduced by the SE SNNC 512 shown in FIG. 5 to a much smaller value. For example, a synthetic context-based object of "00" may indicate that vehicular traffic has been detected on a bridge; "01" may indicate that pedestrian traffic has been detected on a bridge; "10" may indicate that dry conditions have been detected; and "11" may indicate that wet conditions have been detected. Thus, the much smaller size (e.g., two bits) of the synthetic context-based object requires less bandwidth, is faster to transmit, requires less power to transmit, etc. than if the synthetic context-based object was a mere concatenation of the non-contextual data object 704 and the context object 706. However, if power/time resources allow, then a concatenation of the non-contextual data object 704 and the context object 706 will provide more detail of what a particular sensor is detecting.

As mentioned above, in one embodiment of the present invention, the SNNC 212 controls the operations of sensor 208, and/or receives data generated by sensor 208 from register 210. In this embodiment, input neurons into the SNNC 212 shown in FIG. 5 are from the register 210. Operations performed by the SNNC 212 are similar to those described above, except that the sensor readings come from the register 210 instead of directly from the sensor 208.

Figure 8:
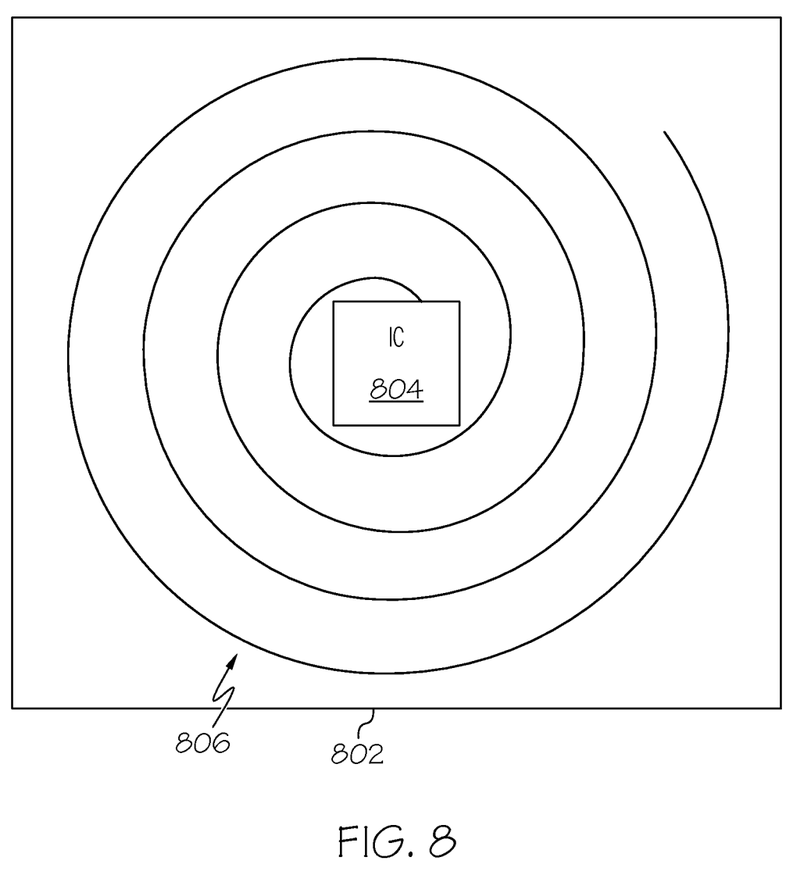
FIG. 8 depicts an exemplary transponder device used in one or more embodiments of the present disclosure.

As depicted in FIG. 2, RFID transponder device 214 is described as using an RFID. This allows the system to utilize the architecture of an RFID when storing sensor data and/or synthetic context-based objects as described herein. With reference now to FIG. 8, an exemplary transponder device used in one or more embodiments of the present disclosure is presented. FIG. 8 depicts an exemplary chip-enabled RFID tag 802, which is a passive RFID tag that has an on-board IC chip 804 and a coupled antenna 806. The IC chip 804 stores for transmission information generated by a sensor system (e.g., sensor system 252 shown in FIG. 2). The IC chip 804 may contain a low-power source (e.g., a capacitor, not shown, that is charged by an interrogation signal received by the coupled antenna 806). Upon the capacitor being charged, the RFID tag 802 then generates a radio signal, which may include sensor information from sensor 208 and/or register 210 stored in the IC chip 804, to be broadcast by the coupled antenna 806. This radio signal can be transmitted directly from the IC chip 804 (i.e., the RFID transponder device 214 in FIG. 2), or it may utilize antenna 201 shown in FIG. 2. If RFID transponder device 214 does not have an antenna (e.g., coupled antenna 806 shown in FIG. 8), then RFID transponder device 214 will use antenna 201.

Thus, as described and/or depicted in FIGS. 2-8, one or more embodiments of the present invention present a sensor system (e.g., sensor system 252 shown in FIG. 2) that comprises: an energy storage device (element 206 in FIG. 2); an intermittent energy release device electrically coupled to the energy storage device, wherein the intermittent energy release device causes the energy storage device to release stored energy intermittently (as shown in FIG. 3-FIG. 4); a sensor electrically coupled to the energy storage device (element 208 in FIG. 2); a register (element 210 in FIG. 2) electrically coupled to the sensor, wherein the register stores readings from the sensor; a synaptic neural network core (element 212 in FIG. 2) electrically coupled to the sensor, wherein the synaptic neural network core converts the readings from the sensor into a synthetic context-based object that is derived from the readings and a context object; a transponder (element 214 in FIG. 2) electrically coupled to the synaptic neural network core; and a storage buffer (element 804 in FIG. 8) within the transponder, wherein the storage buffer stores the synthetic context-based object for transmission by the transponder to a monitoring system.

In an embodiment of the present invention, a sensor system comprise: an energy storage device (element 206 in FIG. 2); an intermittent energy release device (see FIG. 3 and FIG. 4) electrically coupled to the energy storage device, wherein the intermittent energy release device causes the energy storage device to release stored energy intermittently; a synaptic neural network core (element 212 in FIG. 2) electrically coupled to the intermittent energy release device, wherein the synaptic neural network core converts the readings from a sensor into a synthetic context-based object that is derived from the readings and a context object; a transponder (element 214 in FIG. 2) electrically coupled to the synaptic neural network core; and a storage buffer (element 804 in FIG. 8) within the transponder, wherein the storage buffer stores the synthetic context-based object for transmission by the transponder to a monitoring system.

Figure 9:
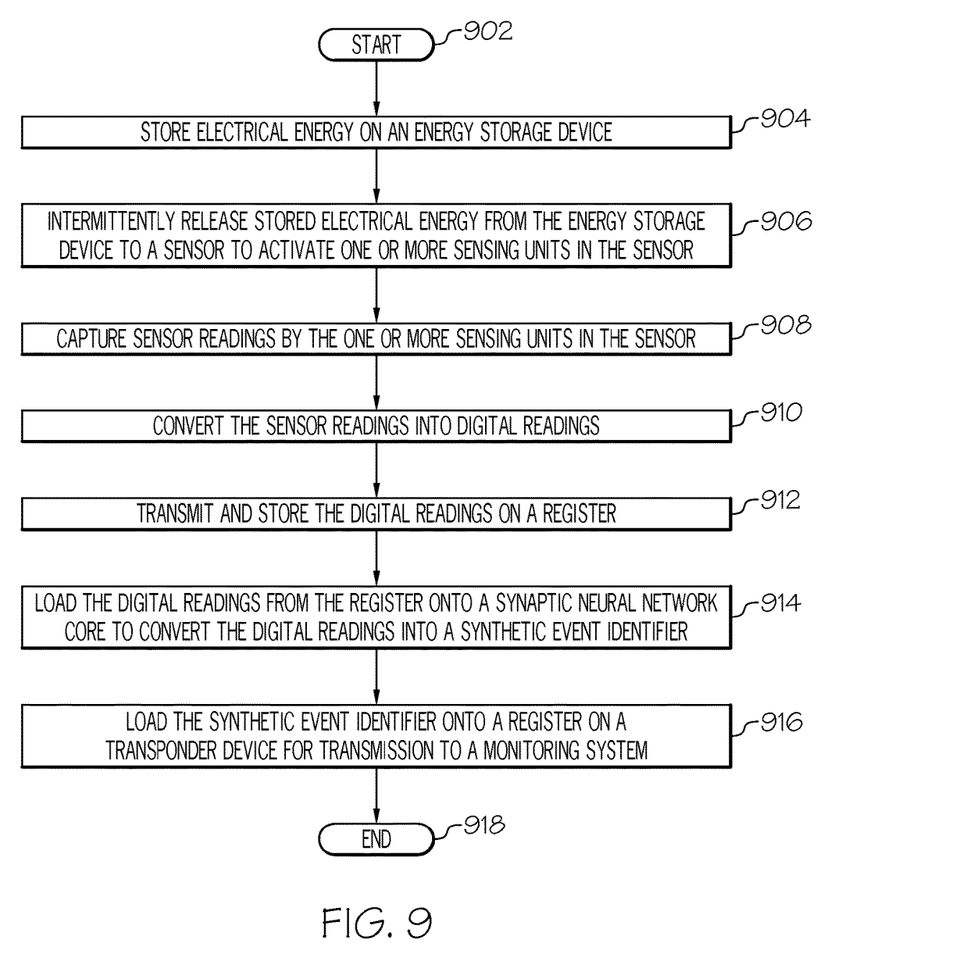
FIG. 9 is a high level flow-chart of one or more operations performed by one or more hardware devices to optimize sensor operations.

FIG. 9 is a high level flow-chart of one or more operations performed by one or more hardware devices to optimize sensor operations.

After initiator block 902, electrical energy is stored on an energy storage device (e.g., energy storage device 206 shown in FIG. 2), as described in block 904.

As described in block 906, stored electrical energy is intermittently released from the energy storage device to a sensor (e.g., sensor 208 in FIG. 2), wherein intermittently released stored electrical energy from the energy storage device activates one or more sensing units (e.g., elements 502/504 in FIG. 5) in the sensor.

As described in block 908, one or more sensing units in the sensor capture sensor readings, which are converted into digital readings if necessary (block 910) before being transmitted to and stored in a register (e.g., register 210 in FIG. 2), as described in block 912.

As described in block 914, readings from the register are loaded onto a synaptic neural network core (e.g., element 212 in FIG. 2), where they are converted into a synthetic event identifier, such that the synthetic event identifier is generated from the readings and a context object.

As described in block 916, the synthetic event identifier is loaded onto a register (e.g., element 804 in FIG. 8) on a transponder device (e.g., element 214 in FIG. 2). The synthetic event identifier is transmitted from the transponder device to a monitoring system (e.g., element 202 in FIG. 2). The flow chart ends at terminator block 918.

In an embodiment of the present invention, the context object is an identifier of a sensor type for the sensor. For example, the context object may be an identifier of a type of sensor (e.g., accelerometer, thermometer, hygrometer, etc.) rather than the specific sensor itself (e.g., "Sensor #1", information from a UUID, a part number, etc.)

In an embodiment of the present invention, power is generated from ambient forces. The power is generated by an ambient power collection device (e.g., element 204 in FIG. 2) that is coupled to the energy storage device. As described herein, the ambient power collection device converts ambient forces into electricity. In various embodiments of the present invention, the ambient forces are from a group consisting of radiofrequency energy, heat, electrical induction forces, acceleration forces, and vibration.

In an embodiment of the present invention, the intermittent energy release device described herein comprises a breakdown diode (e.g., element 307 in FIG. 4). In an embodiment of the present invention, the intermittent energy release device comprises a breakdown transistor, which functionally is similar to element 307 in FIG. 4.

In an embodiment of the present invention, an identifier of a sensor type for the sensor is stored on a sensor identification register (e.g., element 507 in FIG. 5) as the context object. A set of one or more excitatory sensing units (e.g., elements 502a-502b in FIG. 5) within the sensor produce a first type of signal in response to sensing a first type of physical event associated with a physical condition. The first type of signal is transmitted on a first type of electronic neuron (see FIG. 5). A set of one or more inhibitory sensing units (e.g., elements 504a-504b) within the sensor produce a second type of signal in response to sensing a second type of physical event associated with the physical condition. The second type of signal is transmitted on a second type of electronic neuron. A set of synaptic connections within the synaptic neural network core selectively couple the first type of electronic neuron and the second type of electronic neuron to a non-contextual object register (e.g., element 516 in FIG. 5). The non-contextual object register stores non-contextual data received from the set of synaptic connections. A synthetic event synaptic neural network core (e.g., element 512 in FIG. 5) that is electrically coupled to the synthetic event descriptor register and the sensor identification register generates a synthetic event descriptor from contents of the non-contextual object register and the sensor identification register.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A sensor system comprising:
an energy storage device;
an intermittent energy release device electrically coupled to the energy storage device, wherein the intermittent energy release device causes the energy storage device to release stored energy intermittently;
a sensor electrically coupled to the energy storage device, wherein the sensor detects physical events occurring at a physical device, and wherein the sensor is intermittently powered by electrical energy received from the energy storage device via the intermittent energy release device;
a synaptic neural network core electrically coupled to the sensor, wherein the synaptic neural network core converts sensor readings from the sensor into a synthetic context-based object that is derived from the sensor readings and a context object, and wherein the synthetic context-based object describes the physical events occurring at the physical device;
a transponder electrically coupled to the synaptic neural network core; and
a storage buffer within the transponder, wherein the storage buffer stores the synthetic context-based object for transmission by the transponder to a monitoring system.

2. The sensor system of claim 1, further comprising:
a register electrically coupled to the sensor, wherein the register stores the sensor readings from the sensor.

3. The sensor system of claim 1, further comprising:
synaptic connections that electrically connect electronic neurons within the synaptic neural network core, wherein the synaptic connections convert the sensor readings from the sensor into a non-contextual data object that is used, with the context object, to generate the synthetic context-based object.

4. The sensor system of claim 1, further comprising:
an ambient power collection device coupled to the energy storage device, wherein the ambient power collection device converts ambient forces into electricity.

5. The sensor system of claim 4, wherein the ambient forces are from a group consisting of radio frequency energy, heat, electrical induction forces, acceleration forces, and vibration.

6. The sensor system of claim 1, wherein the intermittent energy release device comprises a breakdown diode.

7. The sensor system of claim 1, further comprising:
a sensor identification register, wherein the sensor identification register stores an identifier of the sensor as the context object;
a set of one or more excitatory sensing units within the sensor, wherein excitatory sensing units produce a first type of signal in response to sensing a first type of physical event associated with a physical condition, and wherein the first type of signal is transmitted on a first type of electronic neuron;
a set of one or more inhibitory sensing units within the sensor, wherein inhibitory sensing units produce a second type of signal in response to sensing a second type of physical event associated with the physical condition, and wherein the second type of signal is transmitted on a second type of electronic neuron;
a set of synaptic connections within the synaptic neural network core that selectively couple the first type of electronic neuron and the second type of electronic neuron to a non-contextual object register, wherein the non-contextual object register stores non-contextual data received from the set of synaptic connections; and
a synthetic event synaptic neural network core electrically coupled to a synthetic event descriptor register and the sensor identification register, wherein the synthetic event synaptic neural network core generates a synthetic event descriptor from contents of the non-contextual object register and the sensor identification register.

8. The sensor system of claim 1, further comprising:
a resistor that electrically couples the intermittent energy release device to the sensor, wherein the resistor is sized to allow electrical power to be transmitted to the sensor for a predetermined amount of time.

9. A method of optimizing sensor operations, the method comprising:
storing electrical energy on an energy storage device;
intermittently releasing stored electrical energy from the energy storage device to a sensor, wherein intermittently released stored electrical energy from the energy storage device activates one or more sensing units in the sensor, wherein the sensor detects physical events occurring at a physical device, and wherein the sensor is intermittently powered by electrical energy received from the energy storage device via the intermittent energy release device;
capturing sensor readings by the one or more sensing units in the sensor;
transmitting the sensor readings to a register for storage;
loading the sensor readings from the register onto a synaptic neural network core;
converting, by the synaptic neural network core, the sensor readings into a synthetic event identifier, wherein the synthetic event identifier is generated from the sensor readings and a context object, and wherein the synthetic event identifier describes the physical events occurring at the physical device;
loading the synthetic event identifier onto a register on a transponder device; and
transmitting the synthetic event identifier from the transponder device to a monitoring system.

10. The method of claim 9, wherein the context object is an identifier of a sensor type for the sensor.

11. The method of claim 9, further comprising:
generating power from ambient forces, wherein the power is generated by an ambient power collection device that is coupled to the energy storage device, wherein the ambient power collection device converts ambient forces into electricity, and wherein the ambient forces are from a group consisting of radiofrequency energy, heat, electrical induction forces, acceleration forces, and vibration.

12. The method of claim 9, wherein the intermittent energy release device comprises a breakdown diode.

13. The method of claim 9, further comprising:
storing, on a sensor identification register, an identifier of a sensor type for the sensor as the context object;
producing, by a set of one or more excitatory sensing units within the sensor, a first type of signal in response to sensing a first type of physical event associated with a physical condition, and wherein the first type of signal is transmitted on a first type of electronic neuron;
producing, by a set of one or more inhibitory sensing units within the sensor, a second type of signal in response to sensing a second type of physical event associated with the physical condition, wherein the second type of signal is transmitted on a second type of electronic neuron;
selectively coupling, by a set of synaptic connections within the synaptic neural network core, the first type of electronic neuron and the second type of electronic neuron to a non-contextual object register, and wherein the non-contextual object register stores non-contextual data received from the set of synaptic connections; and
generating, by a synthetic event synaptic neural network core that is electrically coupled to a synthetic event descriptor register and the sensor identification register, a synthetic event descriptor from contents of the non-contextual object register and the sensor identification register.

14. A sensor system comprising:
an energy storage device;
an intermittent energy release device electrically coupled to the energy storage device, wherein the intermittent energy release device causes the energy storage device to release stored energy intermittently to a sensor that detects physical events occurring at a physical device;
a synaptic neural network core electrically coupled to the intermittent energy release device, wherein the synaptic neural network core converts sensor readings directly received from the sensor into a synthetic context-based object that is derived from the sensor readings and a context object, and wherein the synthetic context-based object describes the physical events occurring at the physical device;

a transponder electrically coupled to the synaptic neural network core; and a storage buffer within the transponder, wherein the storage buffer stores the synthetic context-based object for transmission by the transponder to a monitoring system.

15. The sensor system of claim 14, further comprising:
an ambient power collection device coupled to the energy storage device, wherein the ambient power collection device converts ambient forces into electricity.

16. The sensor system of claim 15, wherein the ambient forces are from a group consisting of radiofrequency energy, heat, electrical induction forces, acceleration forces, and vibration.

17. The sensor system of claim 14, wherein the intermittent energy release device comprises a breakdown diode.

18. The method of claim 9, wherein the energy stored on the energy storage device is from an ambient power collection device that generates electricity from ambient vibrations on a bridge, wherein an amount of electricity generated by the ambient power collection device is proportional to a level of the ambient vibrations on the bridge, wherein the sensor comprises multiple vibration detectors that detect the ambient vibrations, wherein the multiple vibration detectors are part of a sensor system, wherein the multiple vibration detectors are mounted on the bridge, and wherein the method further comprises:
powering up, from electricity generated by the ambient power collection device, a quantity of the multiple vibration detectors in proportion to the electricity generated by the ambient power collection device, wherein the quantity of the multiple vibration detectors that are powered up is proportional to an amount of electricity generated by the ambient power collection device; and
determining, by the sensor system, a level of vehicular traffic on the bridge based on the quantity of the multiple vibration detectors that are powered up by the electricity generated by the ambient power collection device.

19. The sensor system of claim 14, further comprising:
a sensor identification register, wherein the sensor identification register stores an identifier of the sensor as the context object;

a set of one or more excitatory sensing units within the sensor, wherein excitatory sensing units produce a first type of signal in response to sensing a first type of physical event associated with a physical condition, and wherein the first type of signal is transmitted on a first type of electronic neuron;

a set of one or more inhibitory sensing units within the sensor, wherein inhibitory sensing units produce a second type of signal in response to sensing a second type of physical event associated with the physical condition, and wherein the second type of signal is transmitted on a second type of electronic neuron;

a set of synaptic connections within the synaptic neural network core that selectively couple the first type of electronic neuron and the second type of electronic neuron to a non-contextual object register, wherein the non-contextual object register stores non-contextual data received from the set of synaptic connections; and a synthetic event synaptic neural network core electrically coupled to a synthetic event descriptor register and the sensor identification register, wherein the synthetic event synaptic neural network core generates a synthetic event descriptor from contents of the non-contextual object register and the sensor identification register.

20. The method of claim 9, wherein the sensor is part of a sensor system, wherein the synaptic neural network core is in the sensor system, and wherein the method further comprises:
receiving, by an antenna in the sensor system, a radio frequency (RF) signal from a monitoring system, wherein the RF signal includes RF energy and instructions;
powering the sensor with the RF energy in the RF signal; and
executing, by the synaptic neural network core in the sensor system, the instructions in the RF signal in order to convert the sensor readings from the sensor into the synthetic event identifier.

\* \* \* \* \*